(No Model.)

S. ALLISON.
WIRE STRETCHER.

No. 528,218. Patented Oct. 30, 1894.

Witnesses
Julius Ulke Jr
N. T. Riley

Inventor
Silas Allison,
By his Attorneys.
C. A. Snow & Co.

UNITED STATES PATENT OFFICE.

SILAS ALLISON, OF OTTAWA, KANSAS.

WIRE-STRETCHER.

SPECIFICATION forming part of Letters Patent No. 528,218, dated October 30, 1894.

Application filed February 13, 1894. Serial No. 500,002. (No model.)

*To all whom it may concern:*

Be it known that I, SILAS ALLISON, a citizen of the United States, residing at Ottawa, in the county of Franklin and State of Kansas, have invented a new and useful Wire-Stretcher, of which the following is a specification.

The invention relates to improvements in wire stretchers.

The object of the present invention is to improve the construction of wire stretchers, and to provide one adapted to carry a spool of wire, and capable of vertical adjustment in order to stretch the wires of a fence at the proper elevation.

The invention consists in the construction and novel combination and arrangement of parts hereinafter fully described, illustrated in the accompanying drawings and pointed out in the claim hereto appended.

Figure 1:
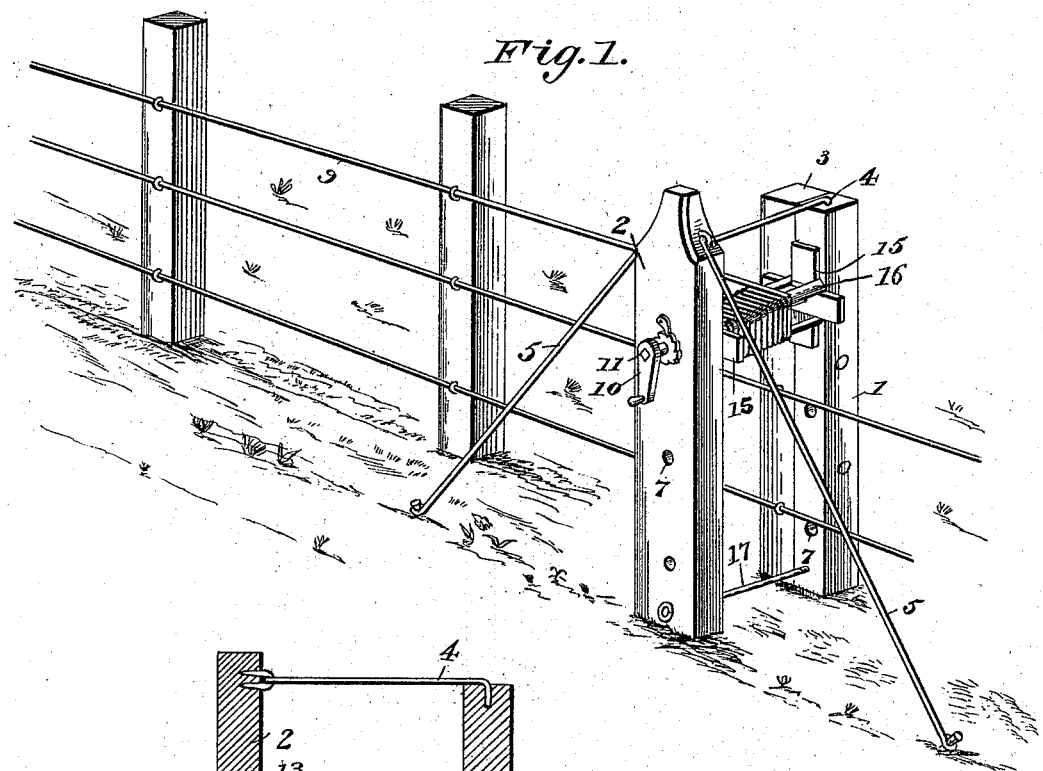
Figure 2:
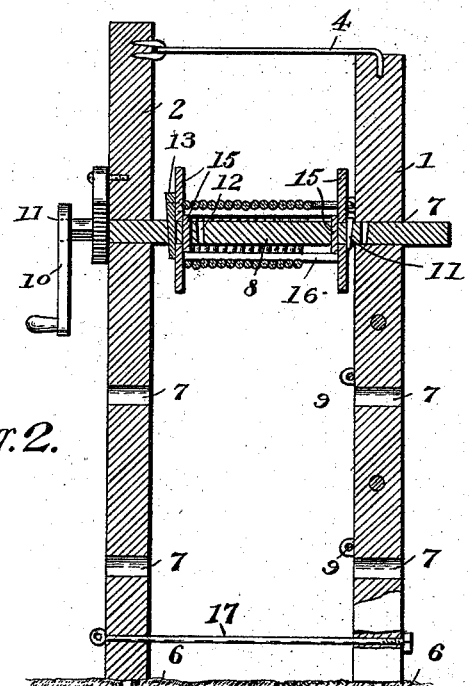
Figure 3:
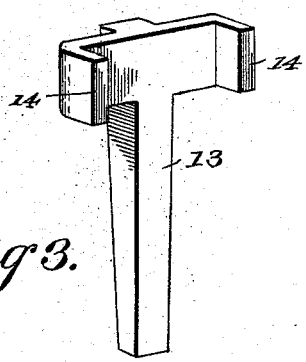

In the drawings—Figure 1 is a perspective view of a wire stretcher constructed in accordance with this invention. Fig. 2 is a vertical transverse sectional view. Fig. 3 is a detail perspective view of the spool clamp.

Like numerals of reference indicate corresponding parts in all the figures of the drawings.

1 and 2 designate uprights of a wire stretcher frame. The upright 1 is detachably secured to a fence post 3; and the other upright 2 is detachably connected with the upright 1, by a hook 4, and is braced by oppositely inclined guide ropes or wires 5. The guide ropes or wires 5 have their upper ends secured to the top of the upright 2, and have their lower ends attached to suitable stakes or pegs, that are driven into the ground. The lower ends of the uprights are provided with spikes 6, by means of which the frame is readily secured in the ground. The hook 4 is hingedly connected with the upright 2, and is adapted to be driven into a socket of the upright 1. The two uprights are connected at the bottom by a horizontal rod or brace 17, arranged in perforations of them and secured detachably in place by nuts, or any other suitable means.

Both uprights are provided with a vertical series of bearing openings 7, which enable a shaft 8 to be journaled at different elevations, in order to stretch a fence wire 9 at the proper height. The shaft is provided at one end with a crank handle 10, and has a key opening 11, and openings 12 adapted to receive a T-shaped clamp 13. The T-shaped clamp 13 has its stem arranged in one of the openings 12, and its arms are provided with parallel lugs 14, which receive between them one of the arms 15 of the wire spool 16, whereby the latter is rigidly connected with the shaft. The key prevents the spool from moving longitudinally on the shaft and retains the arm between the lugs 14.

A ratchet wheel is fixed to the shaft adjacent to the handle 10, and is adapted to be engaged by a pawl pivoted to the adjacent upright for retaining the shaft against rotation during the operation of stapling a wire; but any other equivalent means may be employed.

After a row of fence posts have been erected, the wire stretcher is arranged at one end of the row, and wire from the spool is unwound sufficiently to form one fence wire, which is secured by stapling or otherwise to the farthest or opposite end post. The wire is then stretched by means of the shaft to the desired tension, and is stapled. The shaft is then arranged at a different elevation, and another fence wire is unwound, and is stretched and stapled in the same manner, until this side of the fence is supplied with the desired number of wires. Another portion of the fence is then erected in the same manner, and the operation repeated until the entire fence is built.

It will be seen that the wire stretcher is simple and comparatively inexpensive in construction, that it may be readily mounted in position, and that a spool of wire may be readily arranged on and rigidly connected with the shaft and adjusted to the desired elevation.

Changes in the form, proportion, and the minor details of construction may be resorted to without departing from the principle or sacrificing any of the advantages of this invention.

What I claim is—

In a wire stretcher, the combination of the separable supporting frame comprising the uprights provided with bearing openings and having at their lower ends spikes or points to be inserted in the ground, and a hook loosely connected with one of the uprights, and arranged to engage the top of the other upright whereby the uprights are connected, and a shaft journaled on the uprights and adapted to receive a spool of wire, substantially as described.

In testimony that I claim the foregoing as my own I have hereto affixed my signature in the presence of two witnesses.

SILAS ALLISON.

Witnesses:
 PETER SHIRAS,
 F. W. SHIRAS.